United States Patent
Li

(10) Patent No.: US 9,188,843 B2
(45) Date of Patent: Nov. 17, 2015

(54) PHOTOGRAPHY SUPPORTING FRAME

(71) Applicant: LAP SHUN MANUFACTURE CO., LTD, Zhongshan, Guangdong (CN)

(72) Inventor: Shuqiang Li, Guangdong (CN)

(73) Assignee: Lap Shun Manufacture Co., Ltd., Zhongshan, Guangdong (CN)

( * ) Notice: Subject to any disclaimer, the term of this patent is extended or adjusted under 35 U.S.C. 154(b) by 0 days.

(21) Appl. No.: 14/703,994

(22) Filed: May 5, 2015

(65) Prior Publication Data

US 2015/0234259 A1   Aug. 20, 2015

Related U.S. Application Data

(63) Continuation of application No. PCT/CN2013/087271, filed on Nov. 15, 2013.

(30) Foreign Application Priority Data

Nov. 21, 2012   (CN) .......................... 2012 1 0486616

(51) Int. Cl.
*G03B 17/00* (2006.01)
*G03B 17/56* (2006.01)
*F16M 11/00* (2006.01)

(52) U.S. Cl.
CPC .............. *G03B 17/561* (2013.01); *F16M 11/00* (2013.01)

(58) Field of Classification Search
USPC ................................. 396/419, 428; 248/187.1
See application file for complete search history.

(56) References Cited

U.S. PATENT DOCUMENTS

2010/0019109 A1*   1/2010   Liu ................................ 248/168

FOREIGN PATENT DOCUMENTS

| CN | 201434959 | 3/2009 |
|---|---|---|
| CN | 201281215 | 7/2009 |
| CN | 201818978 | 5/2011 |
| CN | 201917754 | 8/2011 |
| CN | 202183008 | 4/2012 |
| CN | 202205014 | 4/2012 |
| CN | 102944964 | 2/2013 |

OTHER PUBLICATIONS

International Search Report filed in PCT/CN2013/087271 mailed Feb. 27, 2014.

\* cited by examiner

*Primary Examiner* — Minh Phan
(74) *Attorney, Agent, or Firm* — Rankin, Hill & Clark LLP

(57) ABSTRACT

A photography supporting frame comprises a base seat and supporting legs sequentially arranged around the base seat. Connecting bosses are arranged around the base seat; clamping teeth are sequentially arranged on the peripheries of the connecting bosses. The supporting legs each comprise a locating hook, a ball, a spring, an insertion piece, a foot shaft sleeve and a supporting leg rod. The ball and the spring are sequentially arranged in a cavity of the insertion piece from up to down; the locating hook is arranged in the middle of the upper portion of the insertion piece and connected to the ball. The insertion piece is arranged in the foot shaft sleeve. One end of the foot shaft sleeve is connected to one of the connecting bosses, and the other end of the foot shaft sleeve is arranged on the supporting leg rod.

4 Claims, 2 Drawing Sheets

US 9,188,843 B2

PHOTOGRAPHY SUPPORTING FRAME

FIELD OF THE INVENTION

The present application relates to photography supporting frames, and more particularly to a new-style photography supporting frame.

BACKGROUND OF THE INVENTION

With the progress of the society and the continuous improvement of the people's living conditions, the people's demands develop from the past basic material demands, which only require adequate food and clothing, to spiritual demands at higher levels. Photography is a method for recording the details of life or the scenery of nature when the people are travelling in the open air or enjoying the leisure life. Photography apparatuses have already been widely used by ordinary persons, however, when a photographer uses a handheld photography apparatus to shoot, whether the photographer is amateur or professional, he/she may be interfered with by various factors, for example, trembles of hands, instability of feet, and so on, and thus the quality of the shot photos cannot be ensured. Therefore, when photographers use photographic or video apparatuses, they usually need to use triangular supporting frames to fix the apparatuses, so that the shot photos are more beautiful and have better quality. At present, most triangular supporting frames on the market have the following drawbacks: an angle for opening such a supporting frame is limited, and the supporting frame is only able to be opened unidirectionally and is unable to be opened bidirectionally (i.e., is unable to be opened both forwardly and reversely); therefore, the photographic requirements may be not fully met.

SUMMARY OF THE INVENTION

The purpose of the present application is to provide a new-type photography supporting frame which is simple in structure, reasonable in design, and convenient to use, aiming at the drawbacks and deficiencies of the prior art. In this photography supporting frame, a plurality of supporting legs are sequentially arranged on the base seat, and the supporting legs can mesh with clamping teeth arranged on the peripheries of connecting bosses arranged on the base seat by clamping heads arranged on locating hooks arranged in the supporting legs, so that each of the supporting legs can rotate 180 degrees and be opened bidirectionally (i.e., can be opened both forwardly and reversely), and thus the photographic requirement is effectively met. This photography supporting frame is simple in operation and easy to use, can rotate 180 degrees and be opened bidirectionally, and can improve the efficiency of photography work.

In order to realize the above-mentioned purpose, the present application adopts the following technical solution: providing a new-type photography supporting frame, which comprises a base seat and a plurality of supporting legs; wherein, the plurality of supporting legs are sequentially arranged around the base seat; a plurality of connecting bosses are arranged around the base seat; a plurality of clamping teeth are sequentially arranged on the periphery of each of the connecting bosses; each of the supporting legs comprises a locating hook, a ball, a spring, an insertion piece, a foot shaft sleeve, and a supporting leg rod; the ball and the spring are sequentially arranged in a cavity of the insertion piece from up to down; the locating hook is arranged in the middle of the upper portion of the insertion piece and connected to the ball; the insertion piece is arranged in the foot shaft sleeve; one end of the foot shaft sleeve is connected to one of the connecting bosses arranged around the base seat, and the other end of the foot shaft sleeve is arranged on the supporting leg rod.

Furthermore, each of the connecting bosses defines a shaft hole therein.

Furthermore, the periphery of the locating hook is provided with a clamping head.

Furthermore, a middle portion of the locating hook is provided with a fixing ring.

Furthermore, the foot shaft sleeve defines a pin hole therein, and a pin is inserted in the pin hole.

Furthermore, the number of the supporting legs is equal to the number of the connecting bosses arranged around the base seat.

By adopting the above-mentioned structure, the present application achieves the following advantageous effects: in the photography supporting frame of the present application, a plurality of supporting legs are sequentially arranged on the base seat, and the supporting legs can mesh with the clamping teeth arranged on the peripheries of the connecting bosses arranged on the base seat by the clamping heads arranged on the locating hooks arranged in the supporting legs, so that each of the supporting legs can rotate 180 degrees and be opened bidirectionally (i.e., can be opened both forwardly and reversely), and thus the photographic requirement is effectively met. This photography supporting frame is simple in operation and easy to use, can rotate 180 degrees and be opened bidirectionally, and can improve the efficiency of photography work.

Figure 1:
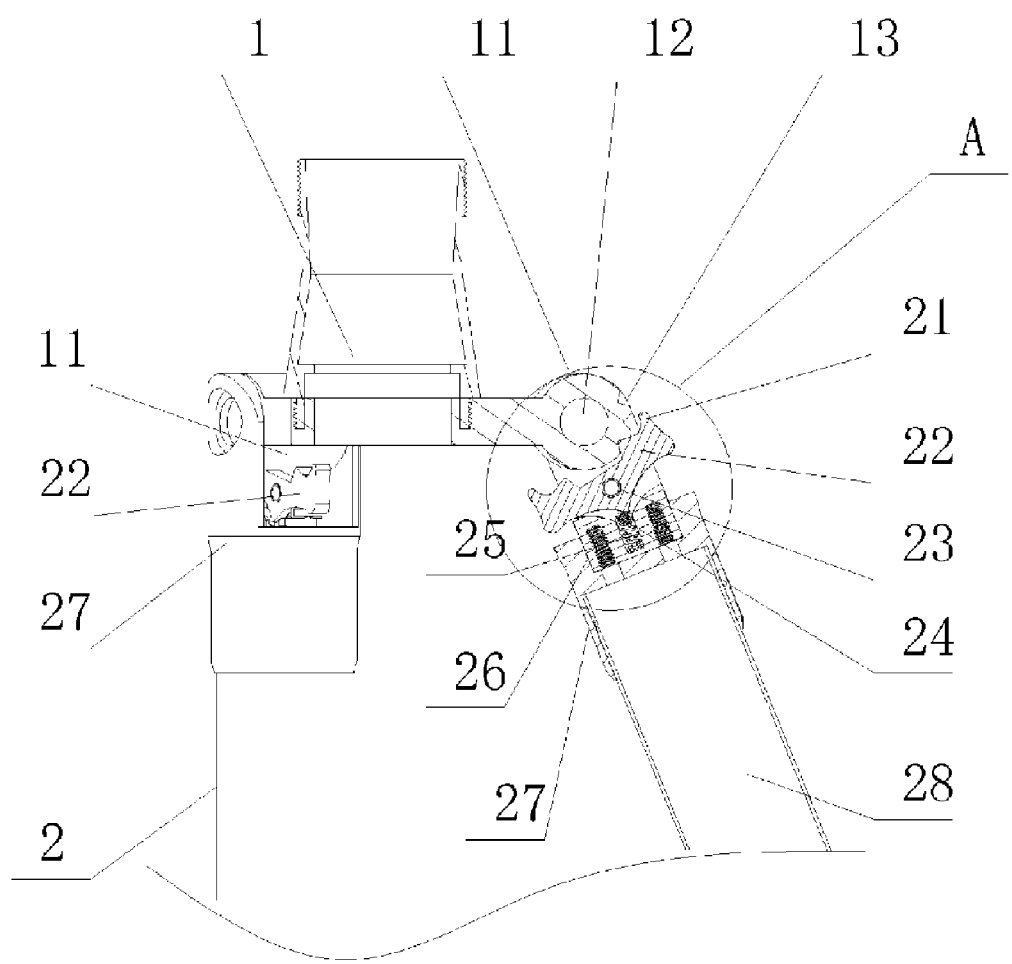
FIG. 1 is a structural schematic view of a photography supporting frame according to an embodiment of the present application.
Figure 2:
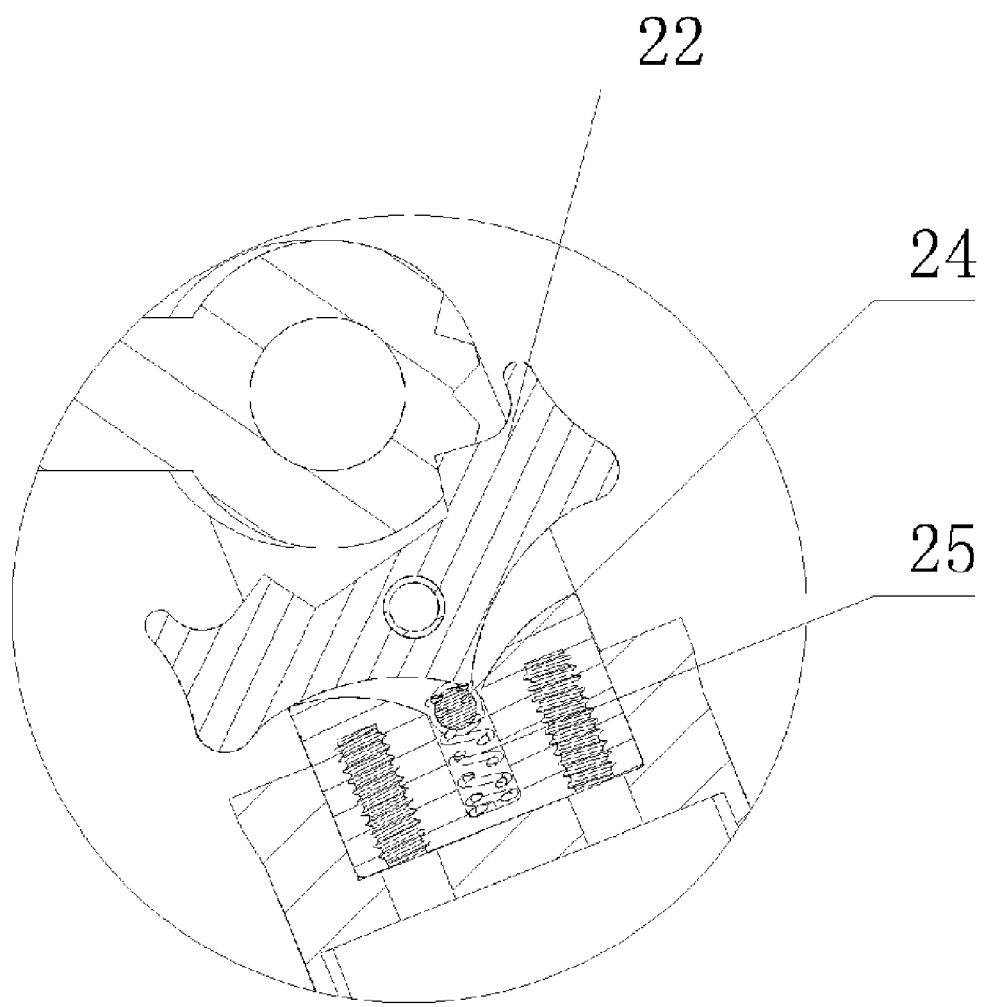
FIG. 2 is an enlarged view of the part A shown in FIG. 1.

In the drawings, the corresponding relationship between numbers and components are as follows:

1-base seat; 2-supporting leg; 11-connecting boss; 12-shaft hole; 21-clamping head; 22-locating hook; 23-fixing ring; 24-ball; 25-spring; 26-insertion piece; 27: foot shaft sleeve; 28- supporting leg rod.

DETAILED DESCRIPTION OF THE PREFERRED EMBODIMENT

The present application will be further described hereafter with reference to the accompany drawings and embodiments.

As shown in FIG. 1, an embodiment of the present application provides a new-type photography supporting frame, which comprises a base seat 1 and a plurality of supporting legs 2; wherein, the plurality of supporting legs 2 are sequentially arranged around the base seat 1; a plurality of connecting bosses 11 are arranged around the base seat 1; a plurality of clamping teeth 13 are sequentially arranged on the periphery of each of the connecting bosses 11; each of the supporting legs 2 comprises a locating hook 22, a ball 24, a spring 25, an insertion piece 26, a foot shaft sleeve 27, and a supporting leg rod 28; the ball 24 and the spring 25 are sequentially arranged in a cavity of the insertion piece 26 from up to down; the locating hook 22 is arranged in the middle of the upper portion of the insertion piece 26 and connected to the ball 24; the insertion piece 26 is arranged in the foot shaft sleeve 27; one end of the foot shaft sleeve 27 is connected to one of the connecting bosses 11 arranged around the base seat 1, and the other end of the foot shaft sleeve 27 is arranged on the supporting leg rod 28.

In a preferred embodiment of the present application, each of the connecting bosses 11 defines a shaft hole 12 therein.

In a preferred embodiment of the present application, the periphery of the locating hook 22 is provided with a clamping head 21.

In a preferred embodiment of the present application, a middle portion of the locating hook 22 is provided with a fixing ring 23.

In a preferred embodiment of the present application, the foot shaft sleeve 27 defines a pin hole therein, and a pin is inserted in the pin hole.

In a preferred embodiment of the present application, the number of the supporting legs 2 is equal to the number of the connecting bosses 11 arranged around the base seat 1.

In the present application, when the photography supporting frame is in a state of forwardly opening the supporting legs 2, each of the supporting legs 2 can be opened by the following operations: the locating hook 22 is pushed upwards, and the supporting leg rod 28 is rotated until the clamping head 21 of the locating hook 22 meshes with the clamping teeth 13 of a corresponding connecting boss 11 on the base seat 1, in this way, the supporting leg rod 28 is opened from a first opening extent to a second opening extent by rotation; in the second opening extent, if the locating hook 22 is further pushed downwards and the above-mentioned operations are repeated, the supporting leg rod 28 will be opened from the second opening extent to a third opening extent by rotation; in the third opening extent, if the locating hook 22 is further pushed downwards and the above-mentioned operations are repeated, the supporting leg rod 28 will be rotated by 90 degrees. On the contrary, when the photography supporting frame is in a state of reversely opening the supporting legs 2, the reversely opening operations are opposite to the operations in the forwardly opening state, and the supporting leg rod 28 can also be rotated by 90 degrees. Therefore, the photography supporting frame provided by the present application can be opened bidirectionally (i.e., can be opened both forwardly and reversely), and can rotate 180 degrees.

In the photography supporting frame of the present application, a plurality of supporting legs 2 are sequentially arranged on the base seat 1, and the supporting legs 2 can mesh with the clamping teeth 13 arranged on the peripheries of the connecting bosses 11 arranged on the base seat 1 by the clamping heads 13 arranged on the locating hooks 22 arranged in the supporting legs 2, so that each of the supporting legs 2 can rotate 180 degrees and be opened bidirectionally, and thus the photographic requirement is effectively met. This photography supporting frame is simple in operation and easy to use, can rotate 180 degrees and be opened bidirectionally (i.e., can be opened both forwardly and reversely), and can improve the efficiency of photography work.

What described above are only preferred embodiments of the present application, and any modifications, equivalent changes, and improvements made according to the structures, characteristics, and principle of the present application should be included in the protection scope of the present application.

What is claimed is:

1. A photography supporting frame comprising a base seat (1) and a plurality of supporting legs (2); wherein, the plurality of supporting legs (2) are sequentially arranged around the base seat (1); a plurality of connecting bosses (11) are arranged around the base seat (1); a plurality of clamping teeth (13) are sequentially arranged on the periphery of each of the connecting bosses (11); each of the supporting legs (2) comprises a locating hook (22), a ball (24), a spring (25), an insertion piece (26), a foot shaft sleeve (27), and a supporting leg rod (28); the ball (24) and the spring (25) are sequentially arranged in a cavity of the insertion piece (26) from up to down; the locating hook (22) is arranged in the middle of the upper portion of the insertion piece (26) and connected to the ball (24); the insertion piece (26) is arranged in the foot shaft sleeve (27); one end of the foot shaft sleeve (27) is connected to one of the connecting bosses (11) arranged around the base seat (1), and the other end of the foot shaft sleeve (27) is arranged on the supporting leg rod (28).

2. The photography supporting frame according to claim 1, wherein, the periphery of the locating hook (22) is provided with a clamping head (21).

3. The photography supporting frame according to claim 1, wherein, a middle portion of the locating hook (22) is provided with a fixing ring (23).

4. The photography supporting frame according to claim 1, wherein, the foot shaft sleeve (27) defines a pin hole therein, and a pin is inserted in the pin hole.

* * * * *